US012188639B1

(12) United States Patent
Balestra

(10) Patent No.: US 12,188,639 B1
(45) Date of Patent: Jan. 7, 2025

(54) MANUAL CONTROL DEVICE FOR MOVING HEAD SPOTLIGHTS

(71) Applicant: Chester Balestra, Ponte Vedra, FL (US)

(72) Inventor: Chester Balestra, Ponte Vedra, FL (US)

( * ) Notice: Subject to any disclaimer, the term of this patent is extended or adjusted under 35 U.S.C. 154(b) by 85 days.

(21) Appl. No.: 18/512,921

(22) Filed: Nov. 17, 2023

(51) Int. Cl.
*H05B 47/10* (2020.01)
*F21V 21/15* (2006.01)
*H05B 47/17* (2020.01)
*H05B 47/18* (2020.01)
*F21W 131/406* (2006.01)

(52) U.S. Cl.
CPC ............. *F21V 21/15* (2013.01); *H05B 47/17* (2020.01); *H05B 47/184* (2024.01); *F21W 2131/406* (2013.01)

(58) Field of Classification Search
CPC .. H05B 47/105; H05B 47/115; H05B 47/155; H05B 47/175; H05B 47/185; H05B 47/345; F21V 21/15; F21V 21/30; F21V 21/40
See application file for complete search history.

(56) References Cited

U.S. PATENT DOCUMENTS 8,449,141 B1 5/2013 Hinrichs
9,526,156 B2 12/2016 LaDuke et al.
9,681,512 B1 * 6/2017 Xiong ................ H05B 45/3725
9,863,622 B1 * 1/2018 Armer ................. F21V 23/0414
9,897,297 B2 2/2018 Brutsche et al.
10,308,330 B1 6/2019 Spivak
10,405,413 B2 9/2019 Feeney
10,670,246 B2 6/2020 Farnik et al.
10,869,734 B2 * 12/2020 Aflatoon ................ A61B 90/30
11,247,099 B2 2/2022 Ristas
11,333,332 B1 * 5/2022 Reyes ...................... F21V 21/15
2017/0071045 A1 * 3/2017 Harvey ................ H05B 45/345
(Continued)

OTHER PUBLICATIONS

Niu et al., Design of Automatic Control System for Stage Following Spotlight Based on UWB Positioning Technology, Jun. 2018, https://www.semanticscholar.org/paper/Design-of-Automatic-Control-System-for-Stage-Based-Niu-Bai/fa3c3ca0e88d2d05d9bbc87c342fd54218a5723a.
(Continued)

*Primary Examiner* — Tung X Le
(74) *Attorney, Agent, or Firm* — Lippes Mathias LLP; Mitchell Ghaneie; Josephine Chen

(57) ABSTRACT

A manual control device coupled to a Digital Multiplex (DMX) lighting controller and a moving head spotlight is configured to allow the moving head spotlight to be manually controlled by a manual controller or perform original functionality of the moving head spotlight. The manual control device comprises a manual control box, which is further comprised of a manual controller, a control module having a microcontroller, and a bypass switch. The microcontroller processes DMX signals including a pan coarse signal, a pan fine signal, a tilt coarse signal, and a tilt fine signal from the DMX light controller, as well as a pan manual control signal and a tilt control signal from the manual controller. The bypass switch is configured to allow the DMX signals to bypass the microcontroller directly to the moving head spotlight or flow through the microcontroller.

20 Claims, 12 Drawing Sheets

(56) References Cited

U.S. PATENT DOCUMENTS

| | | | | |
|---|---|---|---|---|
| 2020/0025359 | A1 | 1/2020 | Conti et al. | |
| 2021/0162912 | A1* | 6/2021 | Spero | H05B 45/395 |
| 2021/0385928 | A1 | 12/2021 | Jiang | |
| 2022/0235925 | A1* | 7/2022 | Erdener | H05B 45/38 |
| 2023/0341099 | A1* | 10/2023 | Cahalane | H05B 45/20 |
| 2023/0380040 | A1* | 11/2023 | Reiss | F21S 2/00 |

OTHER PUBLICATIONS

Hay et al., Design and Implementation of an Automatic Followspot Tracking System, Jan. 2004, https://www.researchgate.net/publication/304015673_Design_and_Implementation_of_an_Automatic_Followspot_Tracking_System.

* cited by examiner

MANUAL CONTROL DEVICE FOR MOVING HEAD SPOTLIGHTS

FIELD OF THE INVENTION

The subject matter disclosed herein generally relates to a manual control device for moving head spotlights and more specifically to a manual control device configured to couple to an existing moving head spotlight such that the existing moving head spotlight can be controlled manually as a follow spotlight or perform original functionality of the moving head spotlight.

BACKGROUND

Moving head spotlights and follow spotlights are among the most commonly used lighting fixtures in the entertainment industry. They are extensively used at a variety of art performances and events, such as live events, music concerts, dance shows, and theater performances to provide dynamic light effects and illuminate areas of interest.

Moving head spotlights are typically affixed to a gimbal mechanism and are controlled by a preprogrammed light controller for predetermined movements. In contrast, follow spotlights are usually mounted on a stand and are subject to manual operation for impromptu and precise movements. As impromptu and precise movements may impose challenges for preprogrammed moving head spotlights and follow spotlights may offer fewer versatile features, both moving head spotlights and follow spotlights are essential in the majority of performances. However, the acquisition of two distinct types of equipment and the personnel needed for operating the equipment result in an increase in overall expenses.

There have been attempted solutions for addressing the need for acquiring both moving head spotlights and follow spotlights in one single device. One example disclosed a moving head light fixture that comprises switching means for switching the moving head between a normal mode of operation and a follow spot of operation. The moving head light fixture comprises a base, a yoke rotatably connected to the base, a head rotatably connected to the yoke, first rotating means for rotating the yoke in relation to the base, second rotating means for rotating the head in relation to the yoke, controlling means to control the first rotating means and the second rotating means, and switching means for switching the moving head between a normal mode of operation and a follow spot mode of operation. Nevertheless, the switching means for the example is incorporated as an integral part of the moving head spotlight, and therefore users may need to obtain a complete moving head spotlight implementing the internal switching means.

Consequently, there is a need for a device that can be adapted to an existing moving head spotlight and provides follow spotlight functionality.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention, nor does it seek to identify or describe any critical or significant elements of the invention or the boundaries of its scope. Its sole purpose is to provide a rudimentary understanding of the invention's concepts and features, which will be expounded upon in greater detail in the ensuing sections.

The present disclosure is generally directed towards a manual control device configured to couple to an existing moving head spotlight and a light controller, preferably a DMX light controller, such that the existing moving head spotlight can be controlled manually as a follow spotlight or perform original functionality of the moving head spotlight. An exemplary, nonlimiting embodiment of the present disclosure provides a manual control device comprising a manual control box. The manual control box is further comprised of a first transceiver, a manual controller, a control module having a microcontroller, and a second transceiver. Preferably, the manual control device further comprises a bypass switch which offers the flexibility to either route DMX signals to bypass the microcontroller directly to the moving head spotlight or flow through the microcontroller. When the DMX signals bypass the microcontroller, the moving head spotlights perform their original functionality. In contrast, when the DMX signals flow through the microcontroller, the microcontroller processes these signals, such that the moving head spotlight may be manually controlled by the manual controller.

The first transceiver is configured to receive DMX signals from the DMX lighting controller and convert the DMX signals to readable signals for a microcontroller. The DMX signals from the DMX lighting controller further comprise a pan coarse signal, a pan fine signal, a tilt coarse signal, a tilt fine signal, and other lightning effects signals, including but not limited to color signals, gobo signals, a dimmer signal, a focus signal, a size signal, and a strobe signal. Specifically, a unit of the pan coarse signal is equivalent to a predetermined number of units of the pan fine signal and a unit of the tilt coarse signal is equivalent to a predetermined number of units of the tilt fine signal.

The manual controller is operable along a pan rotational axis for a predetermined pan angular range and along a tilt rotational axis for a predetermined tilt angular range. A pan manual controller signal is generated by the manual controller based on a pan angular position and a tilt manual controller signal based on a tilt angular position.

The control module further comprises the microcontroller communicated with the manual controller. The microcontroller having a control program may combine the pan coarse signal and the pan fine signal into a pan combined signal and combine the tilt coarse signal and the tilt fine signal into a tilt combined signal. Next, combine the pan manual controller signal and the pan combined signal to generate a pan melded signal and combine the tilt manual controller signal and the tilt combined signal to generate a tilt melded signal. Lastly, convert the pan melded signal and the tilt melded rotational signal to modified DMX signals. The second transceiver is configured to convert the modified DMX signals to readable signals for the moving head spotlight.

According to various embodiments, one or more manual control devices may be implemented in various ways in a DMX lighting system. A DMX signal splitter may be added to the DMX lighting system. The DMX lighting controller may couple to one or more manual controller devices or other DMX devices, including but not limited to, a scanner, LED fixtures, fog and haze machines, pyrotechnic devices, and audio equipment. Each of the one or more manual control devices may be further connected to at least one moving head spotlight.

NUMBER REFERENCES

1—Manual Control Device
10—Manual Control Box
101—DMX Female Port
102—DMX Male Port
103—USB Port
11—First Transceiver
12—Control Module
120—Microcontroller
120*a*—Control Program
13—Manual Controller
14—Second Transceiver
15—Bypass Switch
16—Setting Interface
17—Control Knob
18—Program Switch
19—Reset Button
20—DMX Lighting Controller
21—Computing Device
210—DMX Software
22—USB-to-DMX Adapter
30—Moving Head Spotlight
40—DMX Signal Splitter
50—Dynamic DMX Devices
60—Static DMX Device

DETAILED DESCRIPTION OF THE INVENTION

The following detailed description and accompanying drawings provide a comprehensive disclosure of exemplary embodiments for the purpose of facilitating one of ordinary skill in the relevant art to make and use the invention. Therefore, the detailed description and illustration of the one or more exemplary embodiments presented herein are purely exemplary in nature and are not intended to limit the scope of the invention or its protection in any manner. It is further noted that the drawings may not be to scale, and in some cases, certain details may be omitted which are not necessary for an understanding of the present invention, such as conventional details of fabrication and assembly.

The invention is generally directed towards a manual control device for moving head spotlights, hereinafter as the "manual control device" 1 that is configured to adapt to one or more existing moving head spotlights 30 and a light controller 20, such that the moving head spotlight can be controlled manually as a follow spotlight or perform original functionality of the moving head spotlight. While there is a wide range of light controllers 20 and moving head spotlights 30, this application discusses the invention in the context of a Digital Multiplex (DMX) lighting controller 20 and moving head spotlights 30 controllable by the DMX lighting controller. The DMX lighting controller 20 is preferably a DMX 512, and may be a hardware controller, a software controller programmed in a digital device, or a combination thereof.

Figure 1:
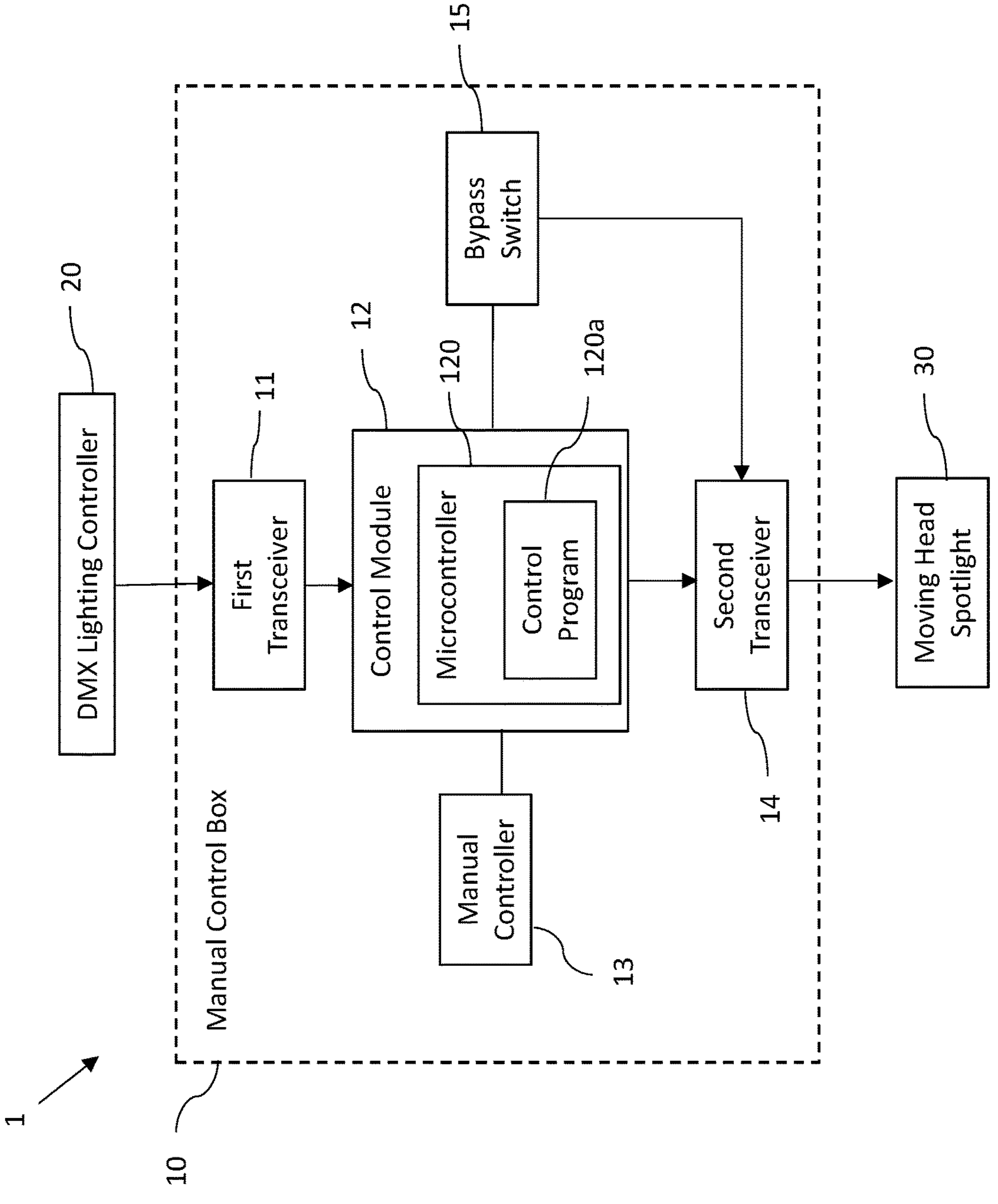
FIG. 1 depicts a block diagram of an exemplary embodiment of a manual control device connected to a DMX lighting controller and a moving head spotlight.

An exemplary, nonlimiting embodiment of the present disclosure, as shown in FIG. 1, provides a manual control device 1 configured to couple to a DMX lighting controller 20 and a moving head spotlight 30. The manual control device 1 comprises a manual control box 10 which is further comprised of a first transceiver 11, a control module 12 having a microcontroller 120, a manual controller 13, and a second transceiver 14. Additionally, the manual control box 10 comprises a bypass switch 15.

The first transceiver 11 communicated with the microcontroller 120, is configured to receive DMX signals from the DMX lighting controller 20 and convert the DMX signals to readable signals for the microcontroller 120. The DMX signals from the DMX lighting controller 20 comprise a pan coarse signal, a pan fine signal, a tilt coarse signal, a tilt fine signal, and other lightning effects signals, including but not limited to color signals, gobo signals, a dimmer signal, a focus signal, a size signal, and a strobe signal. The bypass switch 15 is operable to allow the DMX signals to bypass the microcontroller 120 directly to the moving head spotlight 30 or flow through the microcontroller 120. When the DMX signals flow through the microcontroller 120, the moving head spotlight 30 may be manually controlled by the manual controller 13. Alternatively, when the DMX signals bypass the microcontroller 120, the moving head spotlight 30 performs its original functionality, controlled by the DMX light controller 20.

Further, the manual controller 13 communicates with the microcontroller 120 and may take the form of either an analog controller or a digital controller, including but not limited to a joystick, a trackball, a yoke, or various other types of controllers known in the art. In the exemplary embodiment, the manual controller 13 is depicted as a joystick in FIG. 3, operable along a pan rotational axis X within a 180-degree range and along a tilt rotational axis Y within a 180-degree range. It is anticipated that the manual controller 13 may be designed to be operable along a pan rotational axis X and a tilt rotational axis Y for any predetermined angular range. According to the position of the manual controller 13, the manual controller generates a pan manual controller signal corresponding to the pan angular position and a tilt manual controller signal corresponding to the tilt angular position.

Figure 2:
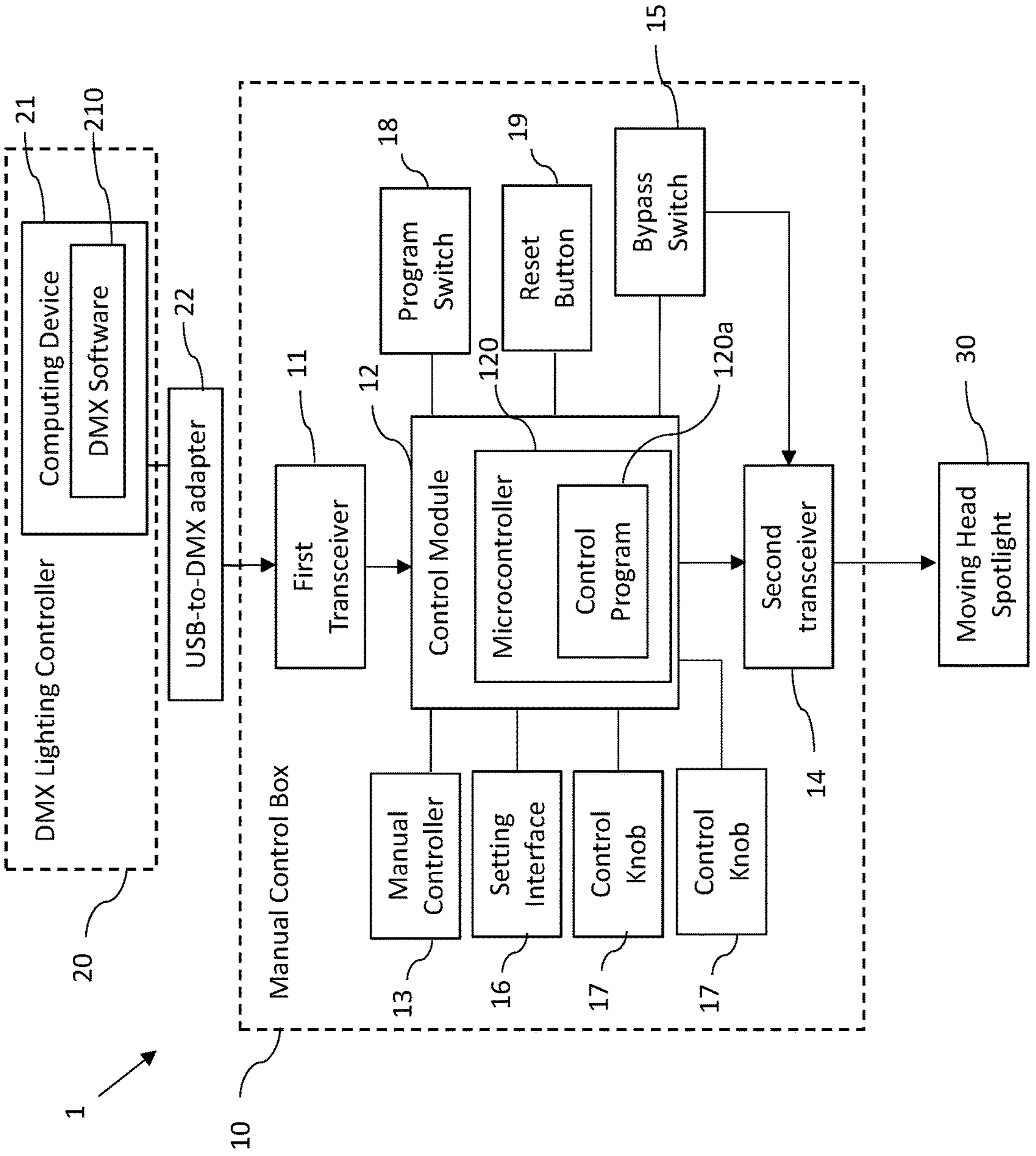
FIG. 2 depicts a block diagram of the exemplary embodiment of the manual control device with additional features.

As illustrated in FIG. 2, the DMX lighting controller 20 may further comprise a computing device 21 implementing a DMX software 210 and is configured to couple to a USB-to-DMX adapter 22 which connects the computing device 21 and the manual control box 10. Furthermore, the manual control box 10 further comprises a setting interface 16, a plurality of control knobs 17, a program switch 18, and a reset button 19. The setting interface 16 is configured to set a DMX address for the manual control device 1 and may be a hardware interface such as a dual in-line package (DIP) switch or a software interface. The plurality of control knobs 17 are configured to control the other DMX signals besides the pan coarse signal, the pan fine signal, the tilt coarse signal, and the tilt fine signal.

Figure 3:
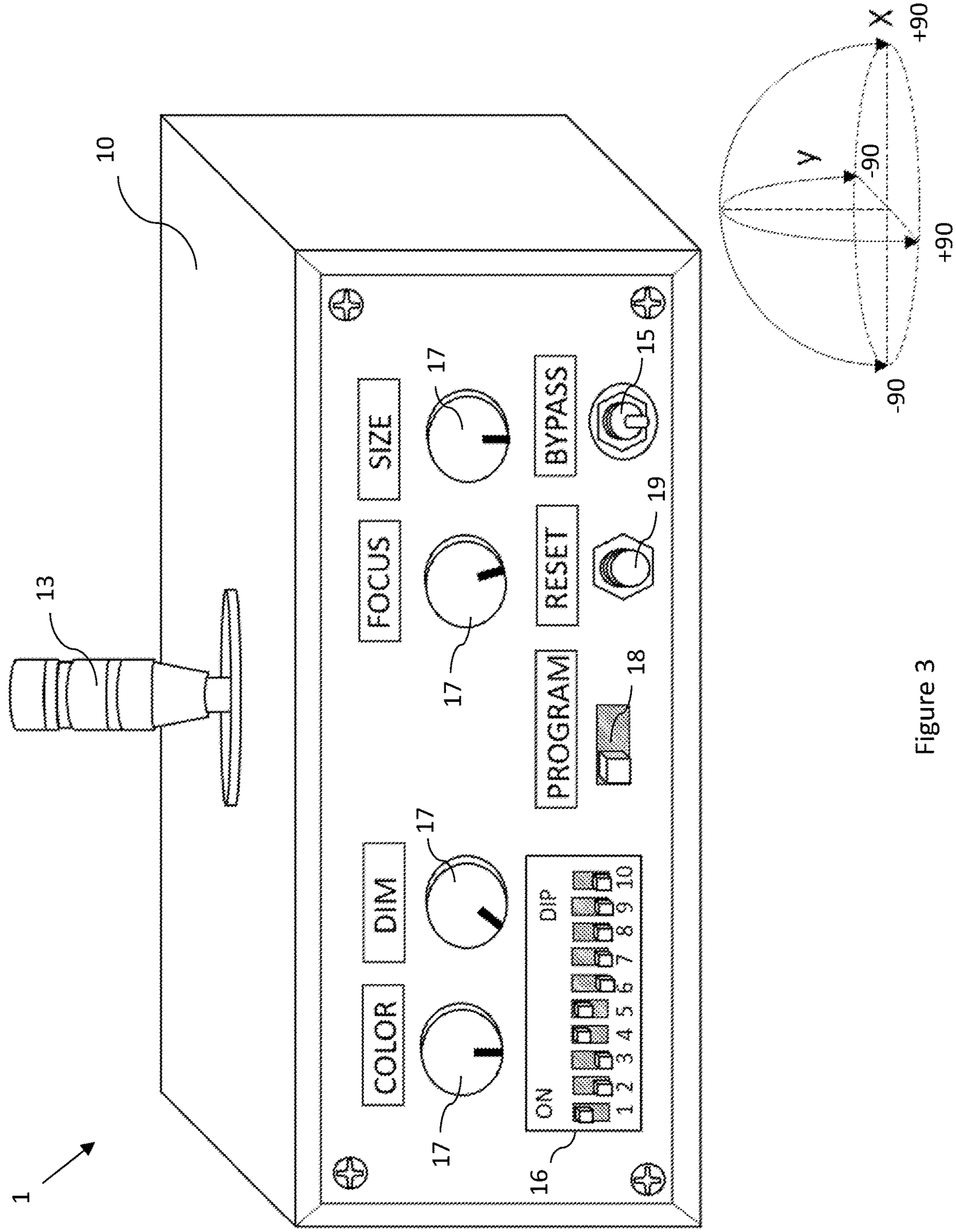
FIG. 3 depicts a front perspective view of the exemplary embodiment of the manual control device.

As illustrated in FIG. 3, the control knobs 17 are configured to control the color signal, the dim signal, the focus signal, and the size signal. It is anticipated that the control knobs may be any other controllers known in the art, including but not limited to, a slider, a potentiometer, and buttons. The program switch 18 is configured to allow the computing device 21 to upload the control program 120*a* to the microcontroller 120 and the reset button 19 is configured to allow the computing device 21 to restart the control program 120*a*. It is anticipated that the control program 120*a* may use readily available public domain software. With the bypass switch 15 in a down bypass mode position, an exemplary user of the manual control box 10 may use the DMX lighting controller 20 to manually determine initial or mid-position of pan and tilt settings. As known in the art, these settings are transformed by the DMX lighting controller 20 into a DMX512 packet at the output of the DMX lighting controller 20. The exemplary user may then press the reset button 19 to direct the microcontroller 120 to reboot the control program 120*a*, which then loads the DMX512 packet from the DMX lighting controller 20 into the microcontroller 120 memory. Thereafter, by switching the bypass switch 15 to the up position, the control module 12 sends the DMX512 packet to the second transceiver 14 and out to the moving head spotlight 30. The control program 120*a* will then recycle the DMX512 packet in its memory, augment each cycle by the manual controller 13 and the control knobs 17, to the control module 12.

Figure 4:
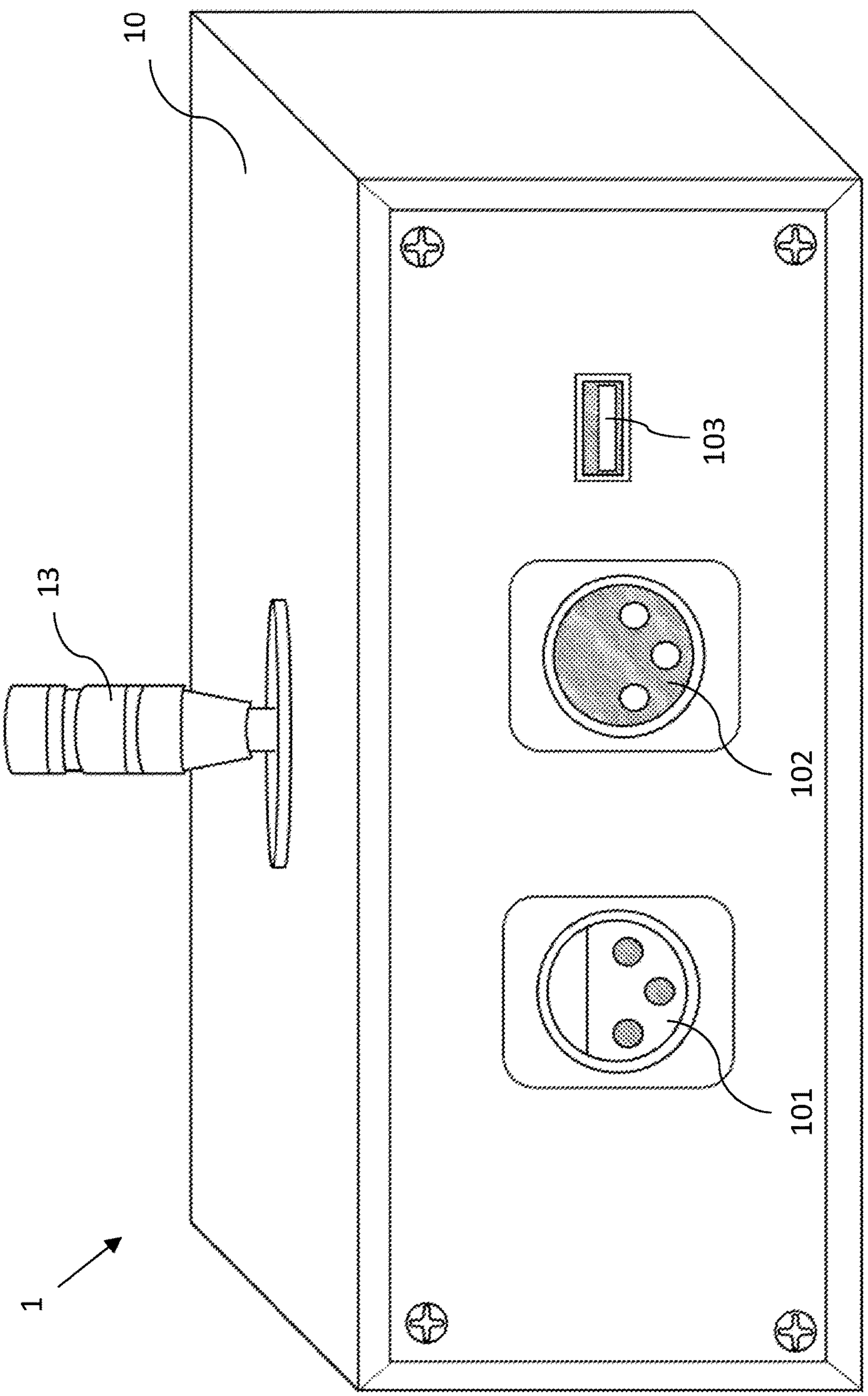
FIG. 4 depicts a rear perspective view of the exemplary embodiment of the manual control device.

As illustrated in FIG. 4, the manual control device 1 is further comprised of a DMX Female Port 101 and a DMX Male Port 102, such that the manual control device 1 may be connected to the DMX lighting controller 20 and the moving head spotlight 30. Additionally, the manual control device further comprises a USB Port 103, such that the computing device 21 may be connected to the manual control device 1 for uploading the control program 120*a* to the microcontroller 120 and for providing power to the manual control box 10.

Figure 5:
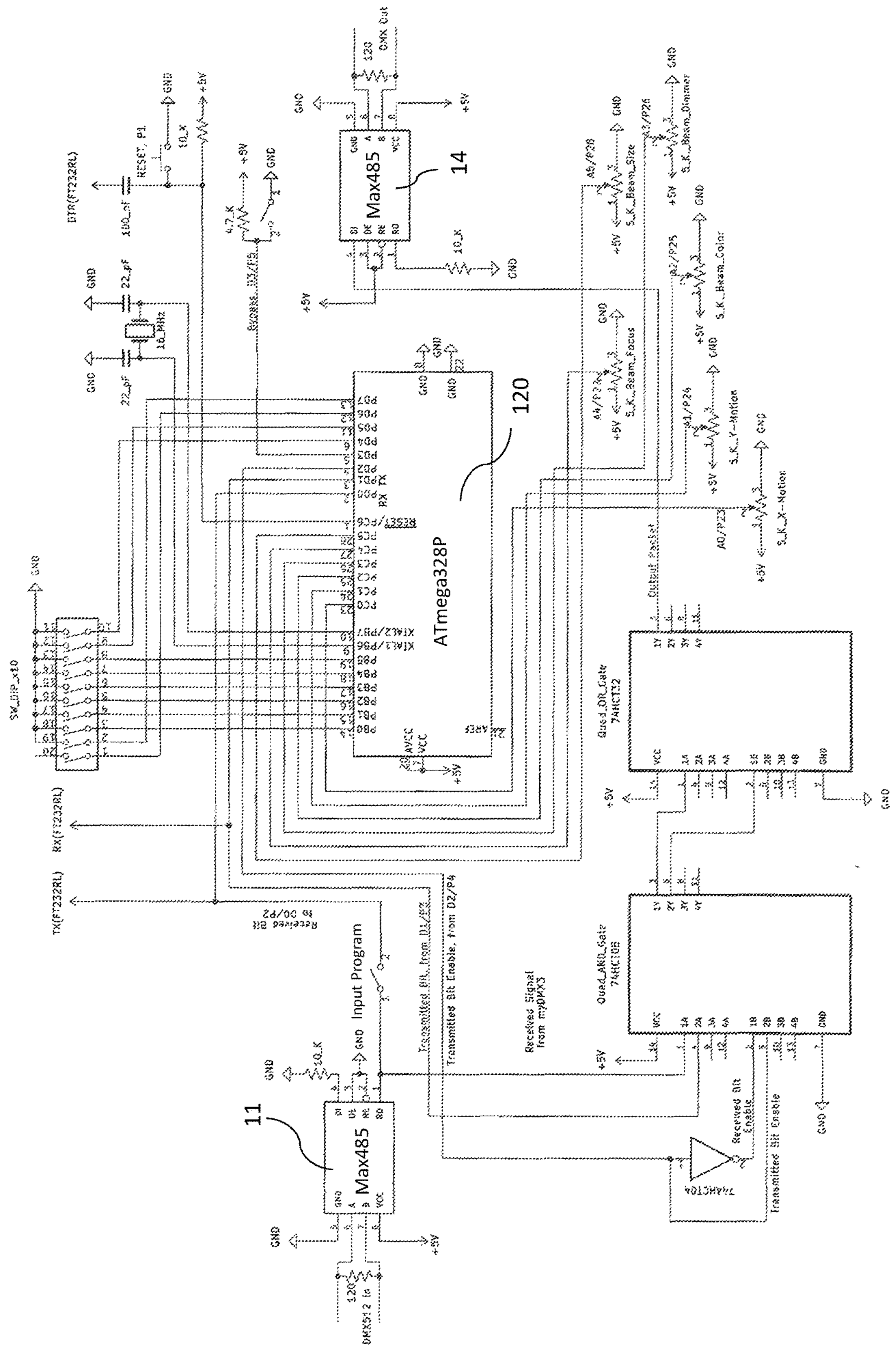
FIG. 5 is a schematic electric circuit of the exemplary embodiment of the manual control device.
Figure 6:
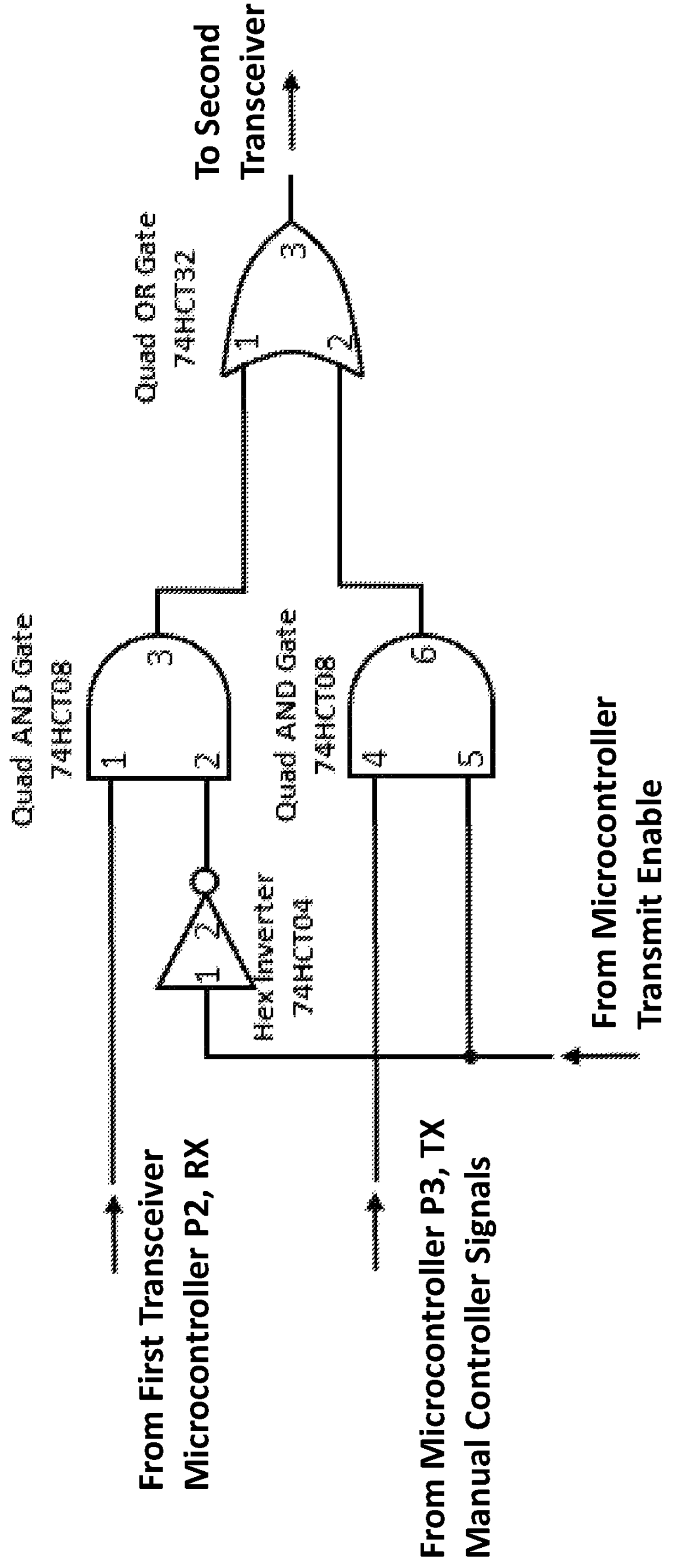
FIG. 6 is a schematic electric circuit depicting the bypass switch utilizing logic gates.
Figure 7:
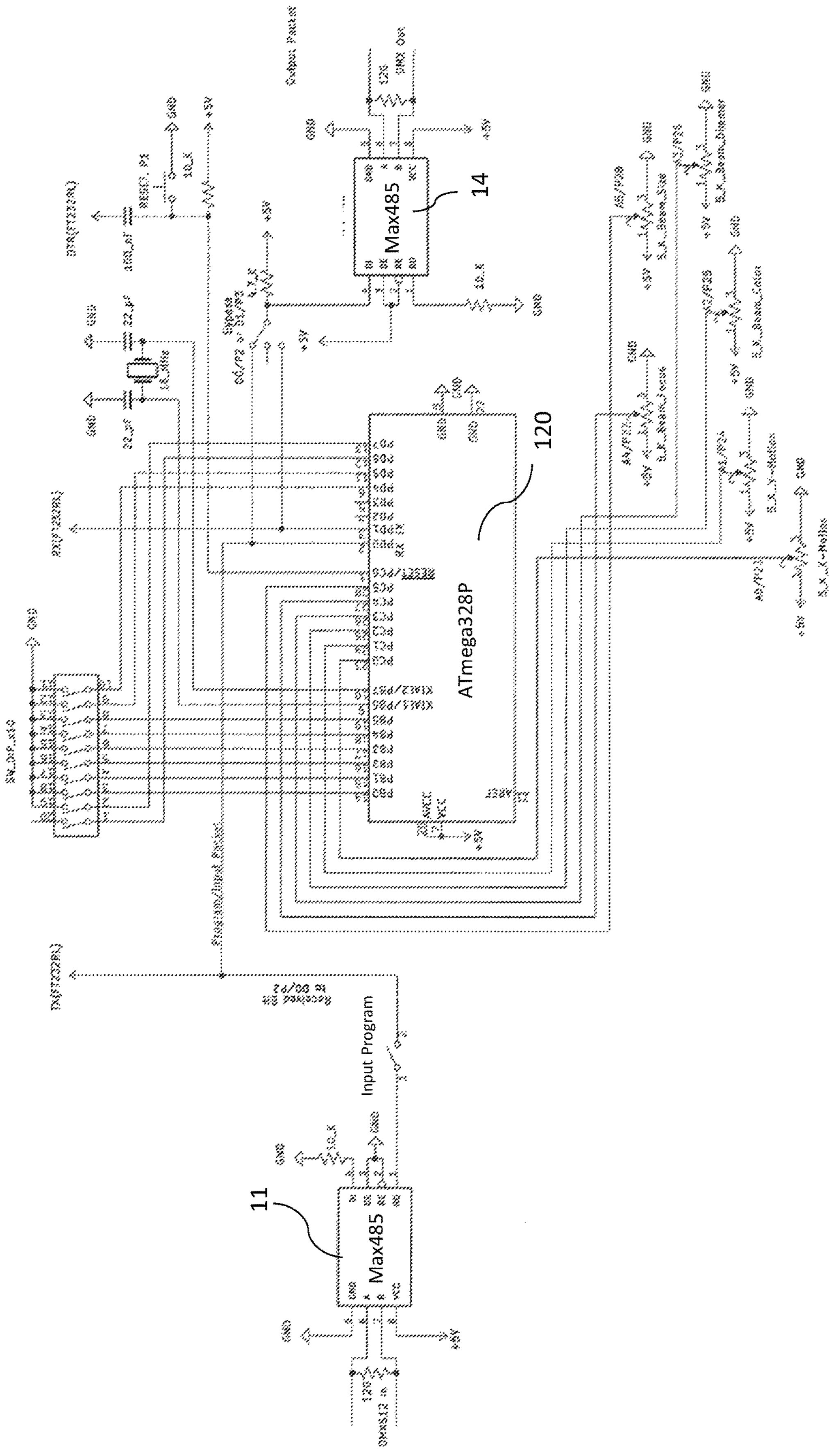
FIG. 7 is a schematic electric circuit of an alternative embodiment of the manual control device.
Figure 8:
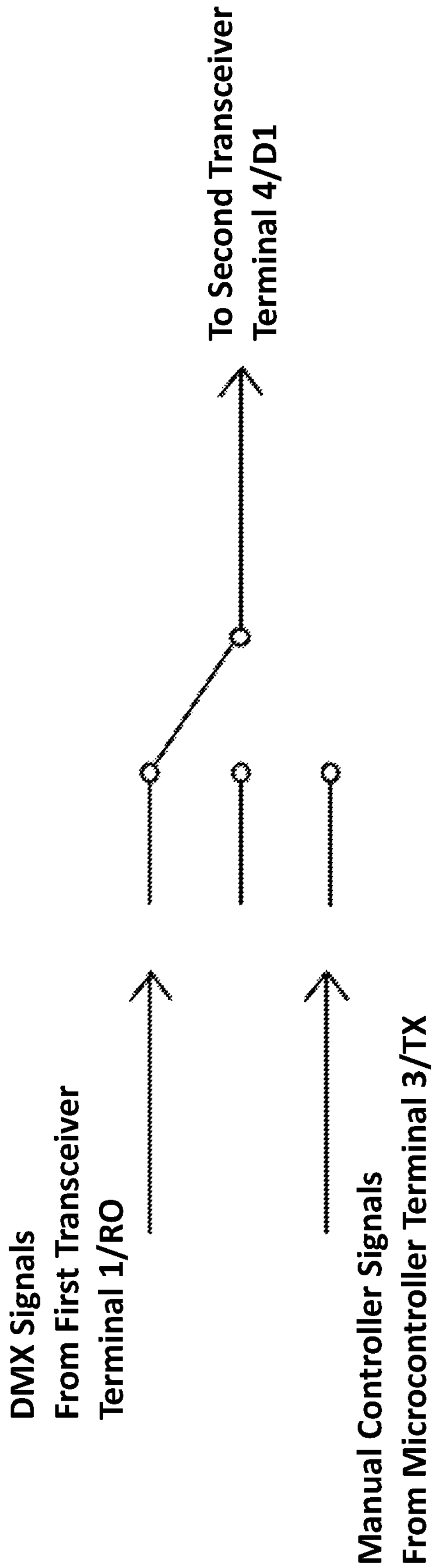
FIG. 8 is a schematic electric circuit depicting the bypass switch utilizing a mechanical switch.

FIGS. 5 to 8 are schematic electrical circuits of the exemplary, nonlimiting embodiment. FIGS. 5 and 6 depict that allowing the DMX signals to bypass or flow through the microcontroller 120 may be achieved by a series of logic gates. Additionally, FIGS. 7 and 8 depict that the bypass switch 15 may be a mechanical switch.

Figure 9:
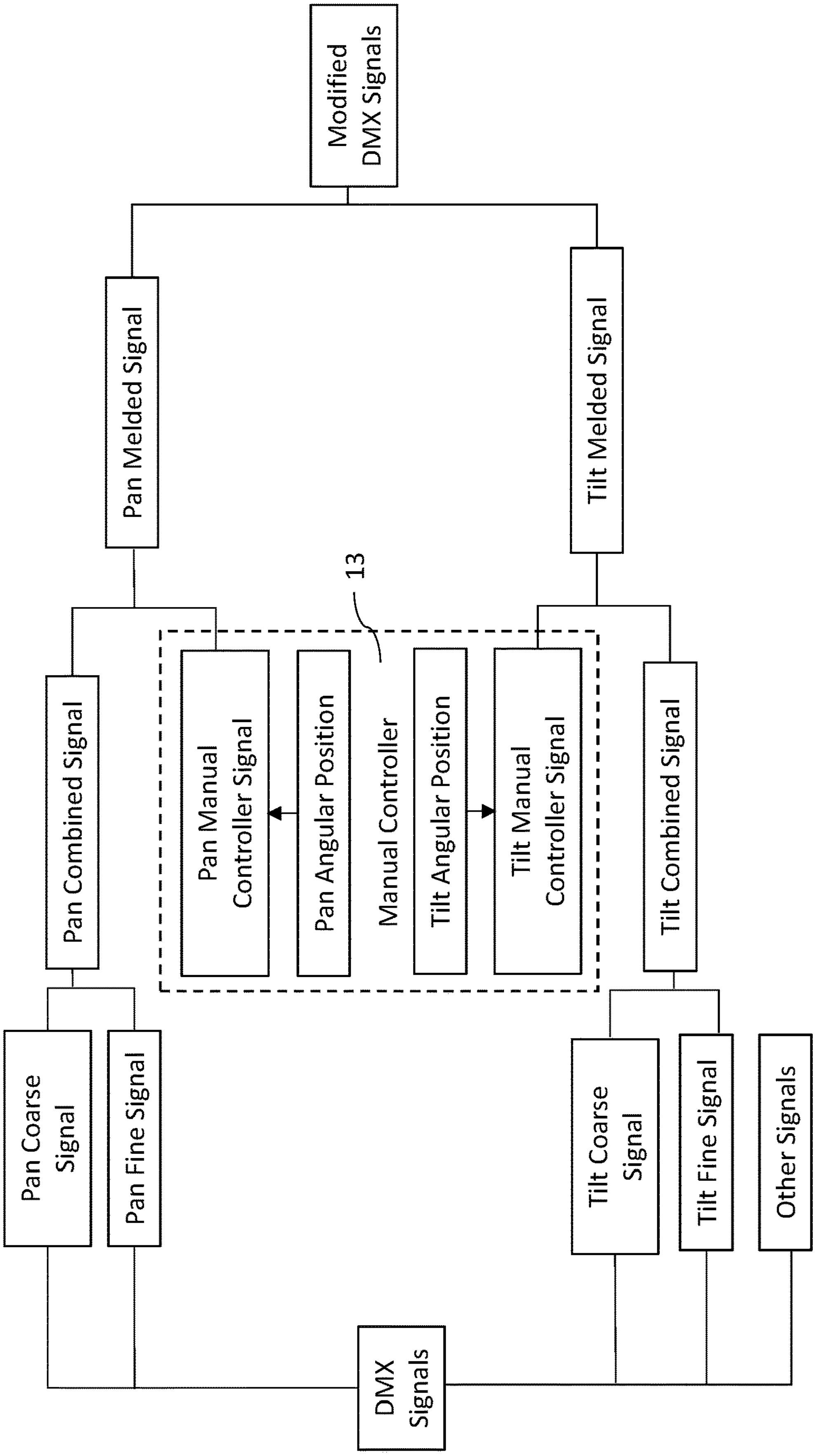
FIG. 9 depicts a block diagram showing how DMX signals are processed by a microcontroller.

The microcontroller 120 receives the DMX signals from the first transceiver 11, as well as the pan manual control signal and the tilt control signal from the manual controller 13, and processes these signals as illustrated in FIG. 9. The pan coarse signal and the pan fine signal are combined into a pan combined signal. Likewise, the tilt coarse signal and the tilt fine signal are combined into a tilt combined signal. On the other hand, the pan manual controller signal based on the pan angular position of the manual controller 13 and the pan combined signal are combined to generate a pan melded signal, and the tilt manual controller signal based on the tilt angular position of the manual controller 13 and the tilt combined signal are combined to generate a tilt melded signal. Thereafter, the pan melded signal and the tilt melded signal are converted into modified DMX signals. Lastly, the second transceiver converts the modified DMX signals to readable signals for the moving head spotlight 30.

Figure 10:
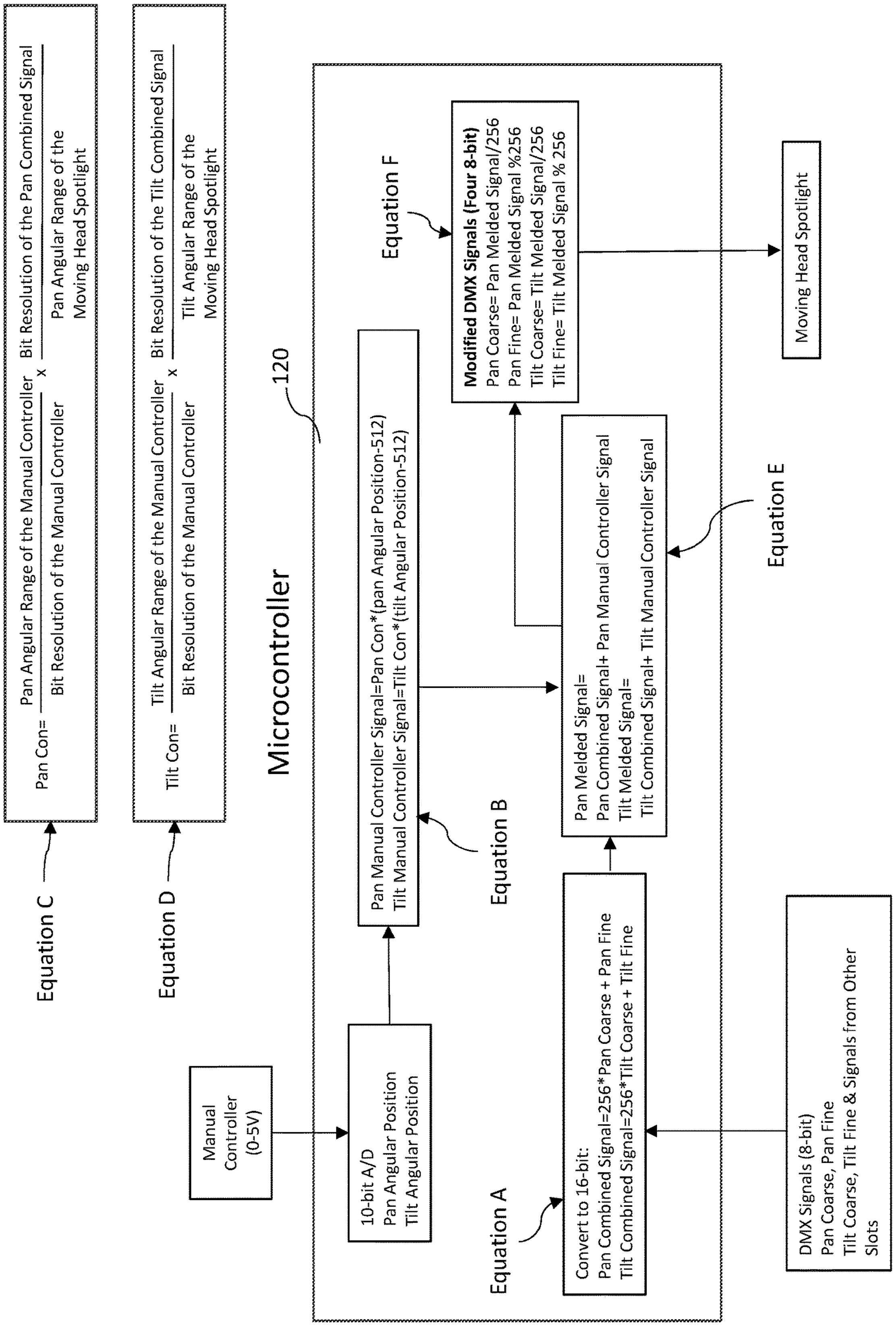
FIG. 10 depicts a block diagram showing how DMX signals are processed by a microcontroller with an algorithm.

For purpose of this application the applicant will set forth an example to discuss how the DMX signals are converted and combined by the microcontroller 120, as illustrated in FIG. 10.

Referring to FIG. 10, each of the DMX signals is denoted by an 8-bit data, which represents a range of values from 0 to 255, resulting in a total of 256 distinct values. The moving head spotlight 30 responds in a specific way to each of the 256 values. Specifically, the pan coarse signal provides 256 equal steps within a pan angular range of the moving head spotlight 30, and the pan fine signal provides a higher level of precision which is 256 equal steps within a pan coarse angular range. Taking the pan angular range of the moving head spotlight 30, which is 630 degrees as an example, each step of the pan coarse signal is approximately 2.46 degrees, calculated by dividing 630 degrees with 256 steps. Further, the pan fine signal provides another 256 steps within each 2.46-degree-range of the pan coarse signal, so each step of the pan fine signal is approximately 0.0096 degrees, calculated by dividing 2.46 degrees with 256 steps. Therefore, the pan fine signal may be considered as a 16-bit data, which is 65536 discrete steps within the 630-degree-range. Similarly, taking the tilt angular range of the moving head spotlight 30, which is 270 degrees as an example, each step of the tilt coarse signal is approximately 1.055 degrees, calculated by dividing 270 degrees with 256 steps. Further, the tilt fine signal provides another 256 steps within each 1.055-degree-range of the tilt coarse signal, so each step of the tilt fine signal is approximately 0.0041 degrees, calculated by dividing 1.055 degrees with 256 steps. Therefore, the tilt fine signal may be considered as a 16-bit data, which is 65536 discrete steps within the 270-degree-range. Consequently, the pan coarse signal and the pan fine signal may be combined by converting the 8-bit data of the pan coarse signal and the pan fine signal as 16-bit data, as shown in Equation A. Likewise, the tilt coarse signal and the tilt fine signal may be combined by converting the 8-bit data of the tilt coarse signal and the tilt fine signal as 16-bit data.

In the example, the manual controller is operable along the pan rotational axis X for 180 degrees and operable along the tilt rotational axis Y for 180 degrees. The analog signals of the manual controller are converted into digital signals in 10-bit resolution, which represents a range of values from 0 to 1023. The pan manual control signal is generated based on a relative value compared to 512 and multiplied by a parameter referred as "Pan Con", as shown in Equation B. Similarly, the tilt manual control signal is generated based on a relative value compared to 512 and multiplied by a parameter referred as "Tilt Con". As shown in Equation C, "Pan Con" may vary based on the pan angular ranges of the manual controller 13 and the moving head spotlight 30, and the bit resolutions of the manual controller 13 and the moving head spotlight 30. Similarly in Equation D, "Tilt Con" may vary based on the tilt angular range of the manual controller 13 and the moving head spotlight 30, and the bit resolution of the manual controller 13 and the moving head spotlight 30.

Thereafter, as shown in Equation E, the pan manual controller signal and the pan combined signal are combined into the pan melded signal, while the tilt manual controller signal and the tilt are combined signal into the tilt melded signal.

Lastly, shown in Equation F, the pan melded signal and the tilt melded signal are converted to modified DMX signals, denoted by four 8-bit datum. This is accomplished by integer arithmetic.

Figure 11:
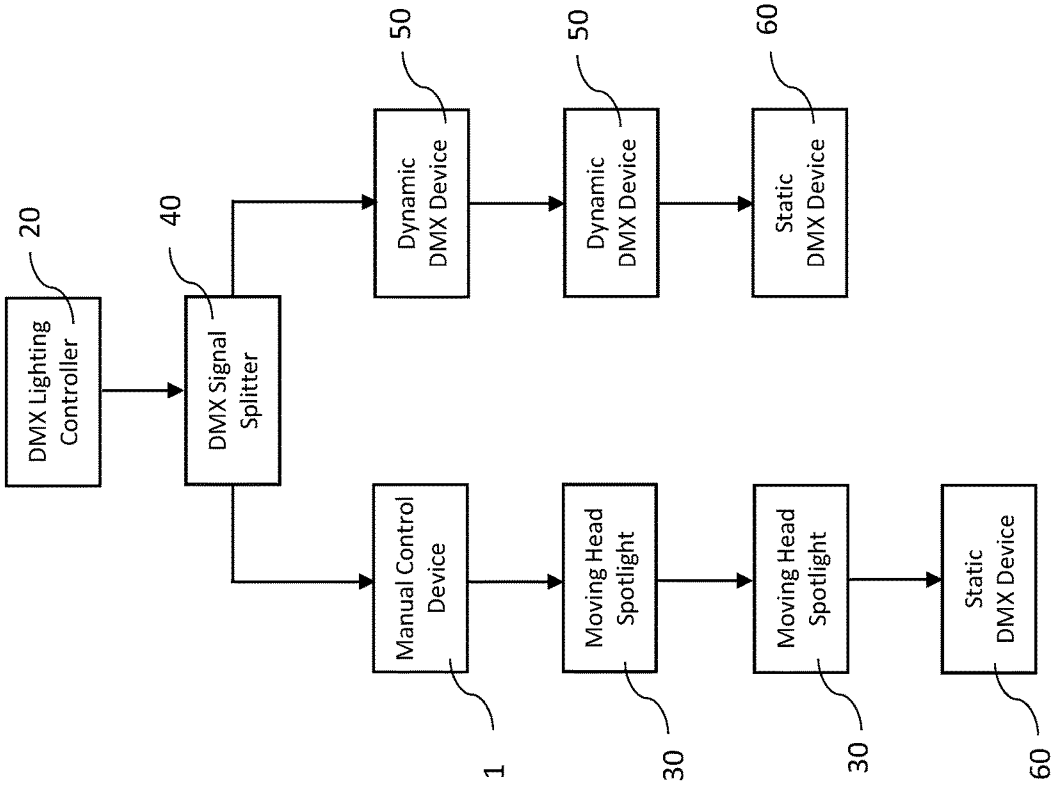
FIG. 11 depicts a block diagram of an exemplary embodiment of a DMX lighting system.
Figure 12:
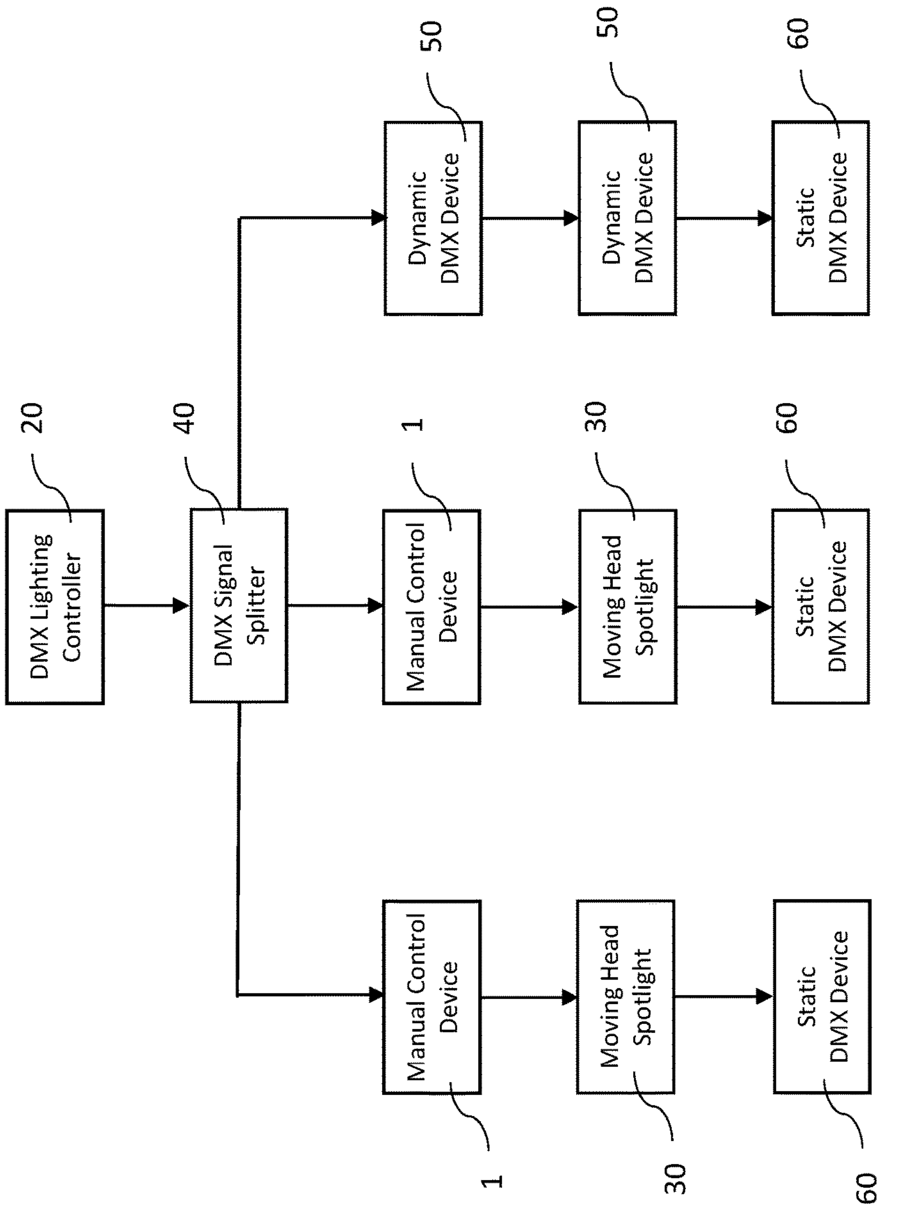
FIG. 12 depicts a block diagram of an alternative exemplary embodiment of a DMX lighting system.

Referring to FIGS. 11 and 12 which depict how a DMX lighting system may utilize a DMX signal splitter 40 to daisy chain multiple devices and implement one or more manual control devices 1. The DMX signal splitter 40 communicates with the DMX lighting controller 20 and has a plurality of output ports which duplicate the DMX signals from the DMX lighting controller 20. FIG. 11 depicts the DMX lighting system having one manual control device 1 and FIG. 12 illustrates the DMX lighting system having more than one manual control devices 1. In a daisy chain where the manual control device 1 is coupled to an output port and further coupled to one or more moving head spotlights 30, the daisy chain may include one or more static DMX devices. Additionally, one or more dynamic DMX devices 50 may be added on a separate daisy chain. The number of moving head spotlights 30 depends on the moving head spotlight functions to be performed and upon the signal output ports available from the microcontroller 120. When the bypass switch 15 allows the DMX signals to be converted by the microcontroller 120, the static DMX devices are not affected by cyclically updates from the DMX lighting controller 20. In contrast, the dynamic DMX devices are cyclically updated from the DMX lighting controller 20. The dynamic DMX devices and the static DMX devices may include but are not limited to, a scanner, LED fixtures, fog and haze machines, pyrotechnic devices, and audio equipment.

While the exemplary embodiment of the present disclosure has been disclosed, certain modifications may be made by those skilled in the art to modify the invention without departing from the spirit of the invention.

The invention claimed is:

1. A manual control device for a moving head spotlight configured to couple to a digital multiplex (DMX) lighting controller and a moving head spotlight, comprising:

a manual control box;

wherein the manual control box comprises:

a first transceiver configured to receive DMX signals from the DMX lighting controller and convert the DMX signals to readable signals for a microcontroller;

wherein the first transceiver is communicated with the microcontroller;

wherein the DMX signals from the DMX lighting controller comprise a pan coarse signal, a pan fine signal, a tilt coarse signal and a tilt fine signal;

wherein a unit of the pan coarse signal is equivalent to a predetermined number of units of the pan fine signal;

wherein a unit of the tilt coarse signal is equivalent to a predetermined number of units of the tilt fine signal;

a manual controller;

wherein the manual controller is operable along a pan rotational axis for a predetermined pan angular range and along a tilt rotational axis for a predetermined tilt angular range;

wherein the manual controller outputs a pan manual controller signal based on a pan angular position;

wherein the manual controller outputs a tilt manual controller signal based on a tilt angular position;

a control module comprising the microcontroller communicated with the manual controller;

wherein the microcontroller having a control program is configured to combine the pan coarse signal and the pan fine signal into a pan combined signal;

wherein the microcontroller is configured to combine the tilt coarse signal and the tilt fine signal into a tilt combined signal;

wherein the microcontroller is configured to combine the pan manual controller signal and the pan combined signal to generate a pan melded signal;

wherein the microcontroller is configured to combine the tilt manual controller signal and the tilt combined signal to generate a tilt melded signal;

wherein the microcontroller is configured to convert the pan melded signal and the tilt melded rotational signal to modified DMX signals; and a second transceiver communicated with the microcontroller and configured to convert the modified DMX signals to readable signals for the moving head spotlight.

2. The device as described in claim 1, wherein the manual control box further comprises a setting interface configured to assign a DMX address.

3. The device as described in claim 2, wherein the setting interface is a dual in-line package (DIP) switch.

4. The device as described in claim 1, wherein the manual control box further comprises a bypass switch.

5. The device as described in claim 1, wherein the bypass switch is configured to allow the DMX signals to bypass directly to the moving head spotlight or flow through the microcontroller.

6. The device as described in claim 1, wherein a unit of the pan coarse signal is equivalent to 256 units of the pan fine signal.

7. The device as described in claim 1, wherein a unit of the tilt coarse signal is equivalent to 256 units of the tilt fine signal.

8. The device as described in claim 1, wherein the DMX signals further comprises a color signal, a dim signal, a focus signal, a size signal, a gobo signal, a strobe signal, or a combination thereof; and wherein the manual control box further comprises one or more control knobs configured to control the color signal, the dim signal, the focus signal, the size signal, the gobo signal, the strobe signal, or the combination thereof.

9. The device as described in claim 1, wherein the manual controller is an analog controller or a digital controller.

10. The device as described in claim 1, wherein the DMX lighting controller further comprises a computing device having a DMX software and is configured to couple to a USB-to-DMX adapter and connect the computing device to the manual control box.

11. The device as described in claim 10, wherein the manual control box further comprises a program switch configured to allow the computing device to upload the control program to the microcontroller.

12. The device as described in claim 10, wherein the manual control box further comprises a reset button configured to allow the microcontroller to restart the control program.

13. A digital multiplex (DMX) lighting system, comprising:

a DMX lighting controller;

a DMX signal splitter communicated with the DMX lighting controller and having a plurality of output ports;

one or more manual control boxes configured to couple to each of the output ports of the DMX signal splitter;

wherein each of the manual control box is configured to connect to at least one moving head spotlight;

wherein each of the manual control box comprises:

a first transceiver configured to receive DMX signals from the DMX lighting controller and convert the DMX signals to readable signals for a microcontroller;

wherein the first transceiver is communicated with the microcontroller;

wherein the DMX signals comprise a pan coarse signal, a pan fine signal, a tilt coarse signal and a tilt fine signal;

wherein a unit of the pan coarse signal is equivalent to a predetermined number of units of the pan fine signal;

wherein a unit of the tilt coarse signal is equivalent to a predetermined number of units of the tilt fine signal;

a manual controller;

wherein the manual controller is operable along a pan rotational axis for a predetermined pan angle and along a tilt rotational axis for a predetermined tilt angle;

wherein the manual controller outputs a pan manual controller signal based on a pan angular position;

wherein the manual controller outputs a tilt manual controller signal based on a tilt angular position;

a control module comprising the microcontroller communicated with the manual controller;

wherein the microcontroller having a control program is configured to combine the pan coarse signal and the pan fine signal into a pan combined signal;

wherein the microcontroller is configured to combine the tilt coarse signal and the tilt fine signal into a tilt combined signal;

wherein the microcontroller is configured to combine the pan manual controller signal and the pan combined signal to generate a pan melded rotational signal;

wherein the microcontroller is configured to combine the tilt manual controller signal and the tilt combined signal to generate a tilt melded signal;

wherein the microcontroller is configured to convert the pan melded signal and the tilt melded rotational signal into modified DMX signals; and a second transceiver communicated with the microcontroller and configured to convert the modified DMX signals to readable signals for each of the moving head spotlights.

14. The system as described in claim 13, wherein each of the manual control box further comprises a bypass switch.

15. The system as described in claim 14, wherein the bypass switch is configured to allow the DMX signals to bypass the microcontroller directly to the moving head spotlight or flow through the microcontroller.

16. The system as described in claim 13, wherein a unit of the pan coarse signal is equivalent to 256 units of the pan fine signal.

17. The system as described in claim 13, wherein a unit of the tilt coarse signal is equivalent to 256 units of the tilt fine signal.

18. The system as described in claim 13, wherein each of the manual control box further comprises a setting interface configured to assign a DMX address.

19. The device as described in claim 13, wherein the DMX signals further comprises a color signal, a dim signal, a focus signal, a size signal, a gobo signal, a strobe signal, or a combination thereof; and wherein the manual control box further comprises one or more control knobs configured to control the color signal, the dim signal, the focus signal, the size signal, the gobo signal, the strobe signal, or the combination thereof.

20. The device as described in claim 13, wherein the manual controller is an analog controller or a digital controller.

* * * * *